US011556380B2

(12) United States Patent
Wang

(10) Patent No.: US 11,556,380 B2
(45) Date of Patent: Jan. 17, 2023

(54) TASK EXECUTION METHOD, APPARATUS, DEVICE AND SYSTEM, AND STORAGE MEDIUM

(71) Applicant: Beijing Dajia Internet Information Technology Co., Ltd., Beijing (CN)

(72) Inventor: Yuchen Wang, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/548,303

(22) Filed: Dec. 10, 2021

(65) Prior Publication Data

US 2022/0100560 A1 Mar. 31, 2022

Related U.S. Application Data

(63) Continuation of application No. PCT/CN2020/077043, filed on Feb. 27, 2020.

(30) Foreign Application Priority Data

Jun. 10, 2019 (CN) .......................... 201910498333.4

(51) Int. Cl.
*G06F 9/48* (2006.01)
*G06F 9/455* (2018.01)
(52) U.S. Cl.
CPC ........ *G06F 9/4881* (2013.01); *G06F 9/45512* (2013.01)
(58) Field of Classification Search
None
See application file for complete search history.

(56) References Cited

U.S. PATENT DOCUMENTS 6,148,323 A 11/2000 Whitner et al.
7,007,275 B1 2/2006 Hanson et al.
(Continued)

FOREIGN PATENT DOCUMENTS

CN 102073546 5/2011
CN 107688496 2/2018
(Continued)

OTHER PUBLICATIONS

Karthick et al; "An Efficient Multi Queue Job Scheduling for Cloud Computing" IEEE 2014; (Karthick_2014.pdf; pp. 164-166) (Year: 2014).*

(Continued)

*Primary Examiner* — Hiren P Patel
(74) *Attorney, Agent, or Firm* — Hanley, Flight & Zimmerman, LLC

(57) ABSTRACT

The present disclosure relates to a task execution method, apparatus, device and system, and a storage medium, wherein same relate to the technical field of computers. The method comprises: acquiring a plurality of tasks to be processed; acquiring a first task in the plurality of tasks to be processed, and controlling a task execution device associated with a current control device to execute the first task; and when a task request of any task execution device is received, acquiring, from the plurality of tasks to be processed, a second task when a target task execution device is the any task execution device, and sending the second task to the any task execution device.

18 Claims, 8 Drawing Sheets

(56) References Cited

U.S. PATENT DOCUMENTS

| | | | |
|---|---|---|---|
| 7,844,708 B2* | 11/2010 | Willehadson | G06F 9/505 718/100 |
| 7,970,872 B2* | 6/2011 | Liu | G06F 9/5066 709/224 |
| 8,205,208 B2* | 6/2012 | Mausolf | G06F 9/4881 709/201 |
| 9,331,943 B2* | 5/2016 | Yeddanapudi | G06F 9/544 |
| 9,342,376 B2* | 5/2016 | Jain | H04L 41/12 |
| 9,442,760 B2* | 9/2016 | Boutin | G06F 9/5066 |
| 9,747,127 B1* | 8/2017 | Florissi | G06F 9/5027 |
| 9,804,895 B2* | 10/2017 | Castellano | H04L 67/1029 |
| 2009/0254914 A1* | 10/2009 | Sundaresan | G06F 9/505 718/103 |
| 2009/0319662 A1* | 12/2009 | Barsness | G06F 9/505 709/226 |
| 2011/0225583 A1* | 9/2011 | Suh | G06F 9/4843 718/1 |
| 2013/0339972 A1* | 12/2013 | Zhang | G06F 11/3447 718/104 |
| 2015/0121387 A1* | 4/2015 | Chang | G06F 9/4881 718/103 |
| 2016/0098292 A1 | 4/2016 | Boutin et al. | |
| 2016/0188594 A1* | 6/2016 | Ranganathan | G06F 9/5066 707/769 |
| 2017/0048352 A1* | 2/2017 | Imamura | G06F 9/5066 |
| 2019/0138638 A1 | 5/2019 | Pal et al. | |
| 2019/0324819 A1* | 10/2019 | Zeng | G06F 9/4881 |

FOREIGN PATENT DOCUMENTS

| | | |
|---|---|---|
| CN | 108304255 | 7/2018 |
| CN | 108762931 | 11/2018 |
| CN | 108762931 A | 11/2018 |
| CN | 108768931 | 11/2018 |
| CN | 108829506 | 11/2018 |
| CN | 109445922 | 3/2019 |
| CN | 109614209 | 4/2019 |
| CN | 109656706 | 4/2019 |
| CN | 110209488 | 9/2019 |

OTHER PUBLICATIONS

European Patent Office, "Extended European Search Report," issued in connection with European Application No. 20822180.4, dated Jul. 8, 2022, 14 pages.

International Searching Authority, "Written Opinion," mailed in connection with International Patent Application No. PCT/CN2020/077043, dated May 29, 2020, 9 pages.

International Searching Authority, "International Preliminary Report on Patentability," mailed in connection with International Patent Application No. PCT/CN2020/077043, dated Dec. 14, 2021, 11 pages.

International Searching Authority, "International Search Report," issued in connection with PCT Patent Application No. PCT/CN2020/0//043, dated May 29, 2020, 4 pages.

China National Intellectual Property Administration, "Notification to Grant the Patent Right for Invention," issued in connection with Chinese Patent Application No. 201910498333.4, dated Oct. 11, 2021, 6 pages.

China National Intellectual Property Administration, "Notification of the Second Office Action," Issued in connection with Chinese Patent Application No. 201910498333.4, dated May 8, 2021, 31 pages.

China National Intellectual Property Administration, "First Office Action," issued in connection with Chinese Patent Application 201910498333.4, dated Dec. 3, 2020, 10 pages.

Book Cataloging in Publication (CIP) Data, "State Grid Corporation Recruitment Exam Guidance Book," World Book Publishing Company Beijing Branch, 1st Edition Jul. 2017, 1st printing Jul. 2017, 5 pages.

Sun, Mingming, "Study on Scheduling Algorithm of Cloud Computing," University of Science and Technology of China, May 2015, 110 pages.

Khan, Zubair et al., "Zvrs Master Slave Parallel Task-Allocating Algorithm Using RR Scheduling and its Implement," Department of Computer Science and Engineering, Invertis Institute University, Bareilly, India, 2012, 9 pages.

* cited by examiner

TASK EXECUTION METHOD, APPARATUS, DEVICE AND SYSTEM, AND STORAGE MEDIUM

CROSS-REFERENCE TO RELATED APPLICATIONS

The present disclosure is continuation of International Application No. PCT/CN2020/077043, filed on Feb. 27, 2020, which claims the priority of the Chinese patent application No. 201910498333.4 filed to China National Intellectual Property Administration on Jun. 10, 2019, both of which the entire contents are incorporated herein by reference.

FIELD

The present disclosure relates to the technical field of computers, in particular to a task execution method, apparatus, device and system, and a storage medium.

BACKGROUND

With development of the computer technology, utilizing a task execution device to execute tasks in batches so as to improve task execution efficiency has become a trend. At present, in related art, a task execution method usually simply encapsulates existing open-source tools such as Ansible or SaltStack, a user may submit a plurality of tasks, and a control device remotely controls a task execution device to execute the tasks.

SUMMARY

The present disclosure provides a task execution method, apparatus, device and system, and a storage medium. The technical solutions of the present disclosure are as follows.

According to a first aspect of an embodiment of the present disclosure, a task execution method is provided, and the task execution method is applied to a control device, and includes: obtaining a plurality of to-be-processed tasks; obtaining a first task in the plurality of to-be-processed tasks, and controlling a task execution device associated with a current control device to execute the first task, wherein an execution mode of the first task is a mode that the control device controls the task execution device to execute a task; and in response to a task request received from one task execution device, obtaining a second task for a target task execution device that is the one task execution device from the plurality of to-be-processed tasks, and sending the second task to the one task execution device, wherein an execution mode of the second task is a mode that the one task execution device executes a task by itself.

According to a second aspect of an embodiment of the present disclosure, a task execution method is provided, and the task execution method is applied to a task execution device, and includes: executing a first task based on a control instruction of a control device associated with the task execution device, wherein an execution mode of the first task is a mode that the control device controls the task execution device to execute a task; sending a task request to the control device, wherein the task request is configured to request a second task needing to be executed by a current task execution device, and an execution mode of the second task is a mode that the task execution device execute a task by itself; receiving the second task for a target task execution device that is the current task execution device; and executing the second task based on a content of the second task.

According to a third aspect of an embodiment of the present disclosure, a task execution apparatus is provided, including: an obtaining unit, configured to obtain a plurality of to-be-processed tasks; and an executing unit, configured to obtain a first task in the plurality of to-be-processed tasks, and control a task execution device associated with a current control device to execute the first task, wherein an execution mode of the first task is a mode that the control device controls the task execution device to execute a task; and the executing unit, is further configured to: in response to a task request received from one task execution device, obtaining a second task for a target task execution device that is the one task execution device from the plurality of to-be-processed tasks, and send the second task to the one task execution device, wherein an execution mode of the second task is a mode that the one task execution device executing executes a task by itself.

According to a fourth aspect of an embodiment of the present disclosure, a task execution apparatus is provided, including: an executing unit, configured to execute a first task based on a control instruction of a control device associated with the task execution device, wherein an execution mode of the first task is a mode that the control device controls the task execution device to execute a task; a sending unit, configured to send a task request to the control device, wherein the task request is configured to request a second task needing to be executed by a current task execution device, and an execution mode of the second task is a mode that the task execution device execute a task by itself; and a receiving unit, configured to receive the second task for a target task execution device that is the current task execution device, wherein the executing unit is configured to execute the second task based on a content of the second task.

According to a fifth aspect of an embodiment of the present disclosure, a control device is provided, including: one or more processors; and one or more memories, configured to store instructions executed by the one or more processors, wherein the one or more processors are configured to execute operations of the first aspect and operations executed by the task execution method according to any of possible implementations of the first aspect.

According to a sixth aspect of an embodiment of the present disclosure, a task execution device is provided, including: one or more processors; and one or more memories, configured to store instructions executed by the one or more processors, wherein the one or more processors are configured to execute operations of the second aspect and operations executed by the task execution method according to any of possible implementations of the second aspect.

According to a seventh aspect of an embodiment of the present disclosure, a task execution system is provided, and includes a control device and a task execution device, wherein the control device is configured to execute the first aspect and operations executed by the task execution method according to any of possible implementations of the first aspect, and the task execution device is configured to execute the second aspect and operations executed by the task execution method according to any of possible implementations of the second aspect.

According to an eighth aspect of an embodiment of the present disclosure, a storage medium is provided. Instructions in the storage medium, when executed by a processor of a control device, cause the control device to execute the first aspect and operations executed by the task execution method according to any possible implementations of the first aspect; or the instructions in the storage medium, when executed by a processor of a task execution device, cause the task execution device to execute the second aspect and operations executed by the task execution method according to any of possible implementations of the second aspect.

According to a ninth aspect of an embodiment of the present disclosure, a computer program product is provided, and includes one or more instructions. The one or more instructions, when being capable of being executed by a processor of a control device, cause the control device to execute the first aspect and operations executed by the task execution method according to any of possible implementations of the first aspect; or the one or more instructions, when being capable of being executed by a processor of a task execution device, cause the task execution device to execute the second aspect and operations executed by the task execution method according to any of possible implementations of the second aspect.

BRIEF DESCRIPTION OF THE DRAWINGS

Accompanying drawings here, which are incorporated in and constitute a part of this specification, illustrate embodiments consistent with the present disclosure and, together with the description, serve to explain principles of the present disclosure and do not constitute an inappropriate limitation on the present disclosure.

DETAILED DESCRIPTION OF THE EMBODIMENTS

Figure 1:
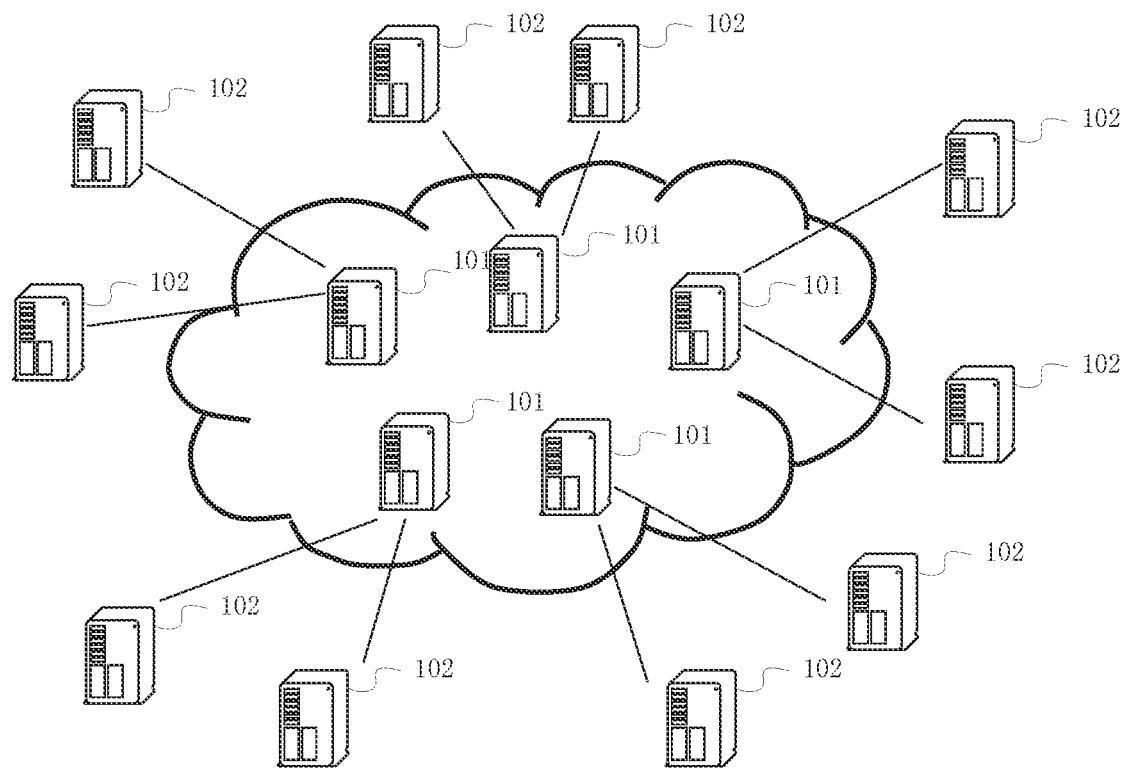
FIG. 1 is a schematic diagram of an implement environment of a task execution method shown according to an exemplary embodiment.
Figure 2:
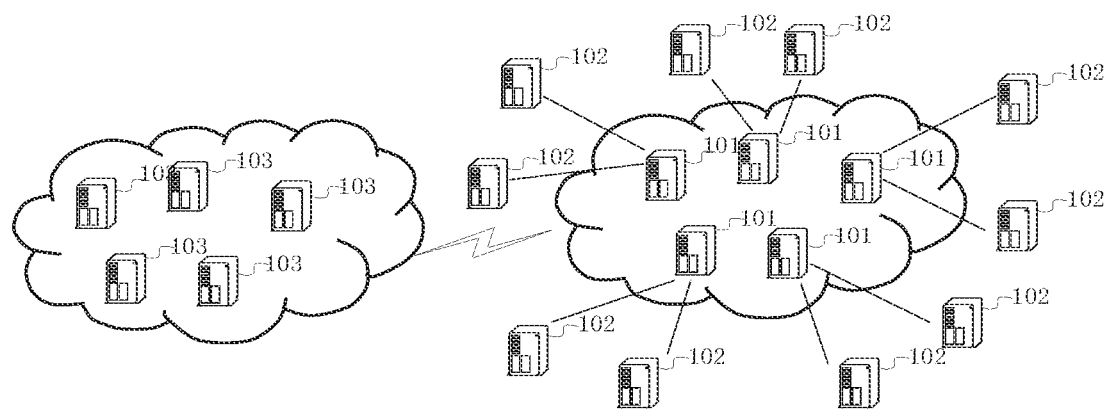
FIG. 2 is a schematic diagram of an implement environment of a task execution method shown according to an exemplary embodiment.
Figure 3:
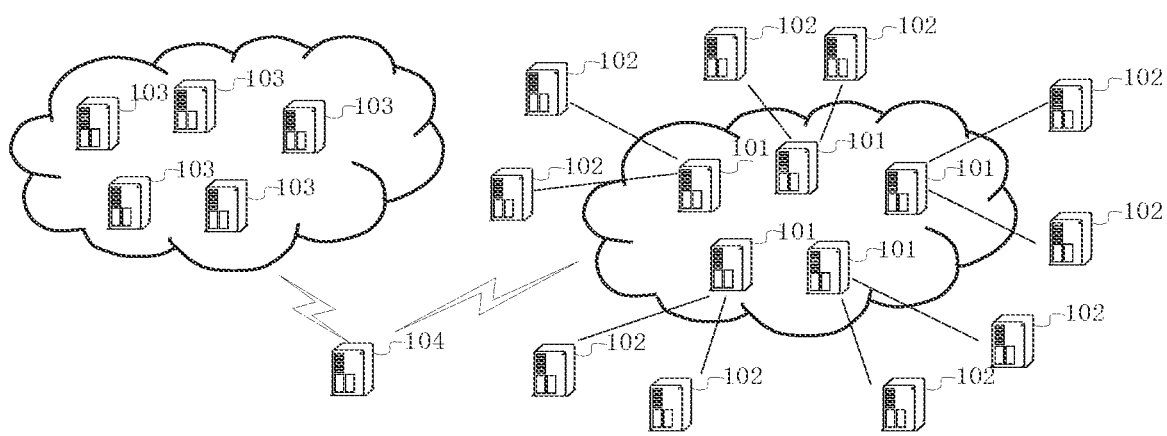
FIG. 3 is a schematic diagram of an implement environment of a task execution method shown according to an exemplary embodiment.

FIG. 1, FIG. 2 and FIG. 3 are each a schematic diagram of an implement environment of a task execution method shown according to an exemplary embodiment. FIG. 1, FIG. 2 and FIG. 3 show the three implement environments of the task execution method. An embodiment of the present disclosure may be applied into any implement environment, which is not limited by the embodiment of the present disclosure.

Referring to FIG. 1, the implement environment may include a plurality of control devices 101 and a plurality of task execution devices 102, and each control device 101 may be connected with the plurality of task execution devices 102 through a network or a date cable. The control devices 101 have a remote control function, and the task execution devices 102 have a task execution function. In the embodiment of the present disclosure, the control devices 101 may remotely control the task execution devices 102 to execute tasks, or the task execution devices 102 may also execute the tasks on its own.

In some embodiments, the plurality of control devices 101 may be connected with an agent where a task execution platform is located through a network or a data cable. The plurality of control devices 101 may obtain a plurality of to-be-processed tasks from the agent where the task execution platform is located, so as to control the task execution devices 102 to execute the tasks, or send the tasks to the task execution devices 102 to make the task execution devices 102 to execute the tasks on its own.

Referring to FIG. 2, the implement environment may further include a plurality of scheduling devices 103 besides the plurality of control devices 101 and the plurality of task execution devices 102, each control device 101 may be connected with the corresponding task execution device 102 through a network or a data cable, and the plurality of scheduling devices 103 may be connected with the control devices 101 through a network or a data cable. The plurality of scheduling devices 103 may obtain the plurality of to-be-processed tasks from the agent where the task execution platform is located, so as to perform task scheduling. In some embodiments, each scheduling device 103 may obtain a task set from the agent where the task execution platform is located in a preemptive mode, and the task set includes the plurality of to-be-processed tasks. The plurality of control devices 101 may obtain the to-be-processed tasks from the plurality of scheduling devices 103.

Referring to FIG. 3, the implement environment may include the plurality of control devices 101, the plurality of task execution devices 102, the plurality of scheduling devices 103 and a storage device 104. Each control device 101 may be connected with the corresponding task execution device 102 through a network or a data cable, the plurality of scheduling devices 103 and the plurality of control devices 101 may be connected with the storage device 104 through a network or a data cable, and the plurality of scheduling devices 103 may obtain a plurality of task sets from the agent where the task execution platform is located. Each scheduling device 103 may send the plurality of to-be-processed tasks in the obtained task sets to the storage device 104. In one possible embodiment, the storage device 104 may include a task queue, the plurality of scheduling devices 103 may add the plurality of to-be-processed tasks in the task sets to the task queue, so that the plurality of control devices 101 may obtain the plurality of to-be-processed tasks from the task queue.

It should be noted that illustration is only made in the above FIG. 1, FIG. 2 and FIG. 3 by taking an example that the control devices 101, the task execution devices 102, the scheduling devices 103 and the storage device 104 are provided as a server. The four kinds of devices may further be provided as a terminal, which is not limited by the embodiment of the present disclosure.

Data structures and two execution modes of the tasks and the task sets (jobs) are simply introduced below. The following data structure is only exemplary description, and does not limit related contents in the embodiment of the present disclosure.

As for the task: one operation behavior on a certain task execution device may be a behavior of executing a user-defined executable file. The task mainly includes the following data.

Identification (ID): a task id, configured to uniquely identify the task.

JobID: an id of the job to which the task belongs, configured to obtain the executable file and execution parameter information.

Host: a host name of a target task execution device, configured to identify the task execution device for task operation.

Action: a task instruction, including execution and termination.

ExecuteMode: a task execution mode, divided into a remote execution mode and a local execution mode.

Log: an output log in a task execution process, including all standard outputs and error outputs.

ReturnCode: a task execution return code, configured to identify a task execution result.

Status: a task status.

As for the job: one batch operation executed for a batch of task execution devices, the job is a set of tasks, and one agent in the job corresponds to one task. The job mainly includes the following data.

ID: a job id, configured to uniquely identify the job.

Name: a job name.

Script: a script command, i.e., a command needing to be executed by the job in batches, supporting three script command types of Shell, Python and Yaml.

Args: a command parameter, i.e., a parameter needed by the script command.

Account: an execution account, i.e., a system account during command execution.

Hosts: an agent list, i.e., host names or IP lists of the agents for batch execution.

Concurrence: a concurrent degree, i.e., the quantity of tasks executed concurrently.

Tolerance: a failure quantity, and execution of the job is paused when exceeding the quantity.

PausedHost: a paused point, and execution of the job is paused when execution is performed to the agent which is the paused point.

Timeout: a time out.

Status: a job status.

Two Execution Modes

The remote execution mode, is a mode that the control device controls the task execution device to execute the task, and refers to that after the control device (may also be called a remote executor or a central-control machine) obtains the task and is connected to the target task execution device through a secure shell (SSH) command (remote login command), the task execution device is controlled by the control device to execute the task. The mode needs the remote executor to be capable of remotely logging in any target machine, and is a centralized mode.

The local execution mode, is a mode that the task execution device executes the task by itself, and refers to that the target task execution device actively obtains a to-be-executed task list and stores the task to the local, and the local actively triggers execution of the task and reports the task execution result. The local execution mode is a decentralized mode.

Figure 4:
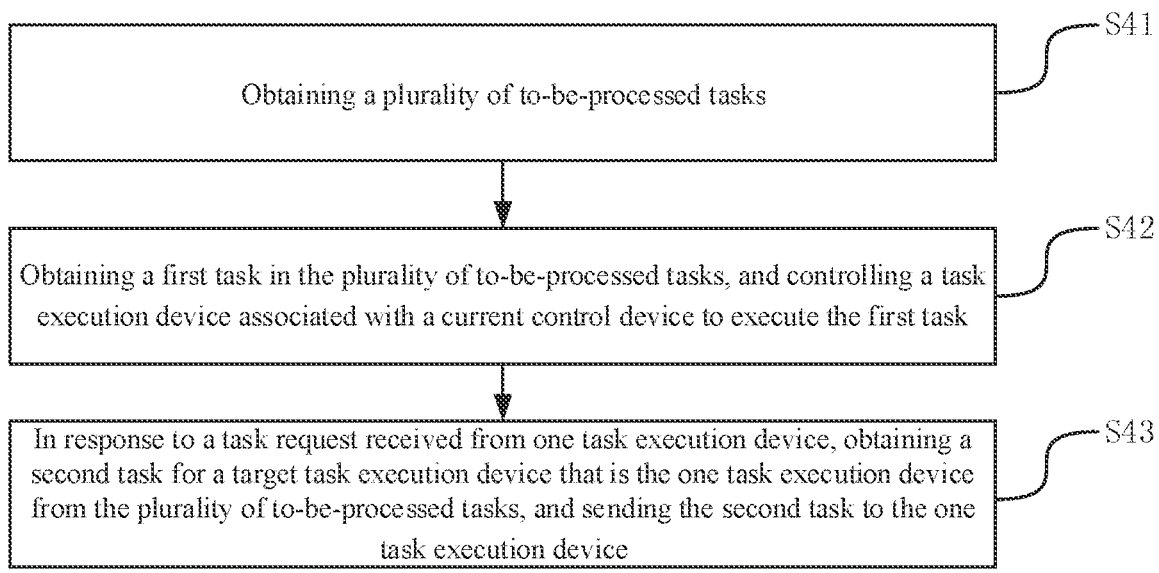
FIG. 4 is a flow diagram of a task execution method shown according to an exemplary embodiment.

FIG. 4 is a flow diagram of a task execution method shown according to an exemplary embodiment. As shown in FIG. 4, the task execution method is applied to a control device, and includes the following steps.

In step S41, a plurality of to-be-processed tasks are obtained.

In step S42, a first task in the plurality of to-be-processed tasks is obtained, and a task execution device associated with a current control device is controlled to execute the first task, wherein an execution mode of the first task is a mode for controlling the task execution device by the control device to execute the task.

In step S43, in response to a task request received from any one task execution device, a second task for a target task execution device being the one task execution device is obtained from the plurality of to-be-processed tasks, and the second task is sent to the one task execution device, wherein an execution mode of the second task is a mode for executing the task by the task execution device on its own.

As for the plurality of obtained to-be-processed tasks in the embodiment of the present disclosure, the first task needing to be executed by the control device may be selected, then the task execution device is controlled to execute the first task, and the second task needing to be executed by the task execution device on its own may also be sent to the corresponding task execution device. That is to say, the two execution modes are supported at the same time and are compatible, a more flexible task execution service is provided, a user may randomly submit the tasks with the two execution modes, and therefore, the above task execution method is high in universality.

Figure 5:
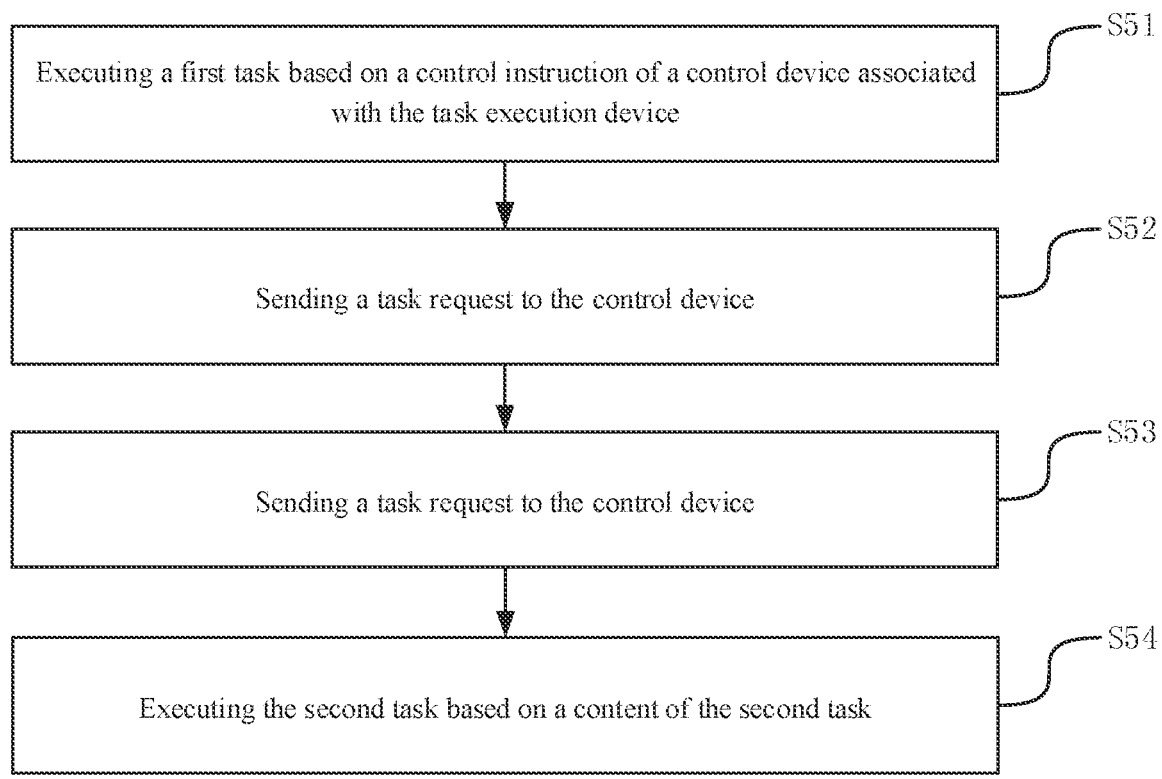
FIG. 5 is a flow diagram of a task execution method shown according to an exemplary embodiment.

FIG. 5 is a flow diagram of a task execution method shown according to an exemplary embodiment. As shown in FIG. 5, the task execution method is applied to a task execution device, and includes the following steps.

In step S51, a first task is executed based on a control instruction of an control device associated with the task execution device, wherein an execution mode of the first task is a mode for controlling the task execution device by the control device to execute a task.

In step S52, a task request is sent to the control device, wherein the task request is configured to request a second task needing to be executed by a current task execution device, and an execution mode of the second task is a mode for executing the task by the task execution device on its own.

In step S53, a second task for a target task execution device being the current task execution device is received.

In step S54, the second task is executed based on a content of the second task.

In the embodiment of the present disclosure, the first task may be executed according to the control instruction of the associated control device, the second task needing to be executed on its own may also be received, and the second task is executed based on the content of the second task. That is to say, the two execution modes are supported at the same time and are compatible, a more flexible task execution service is provided, a user may randomly submit the tasks with the two execution modes, and the tasks may all be processed through processes of the task execution method. Therefore, the above task execution method is high in universality.

Figure 6:
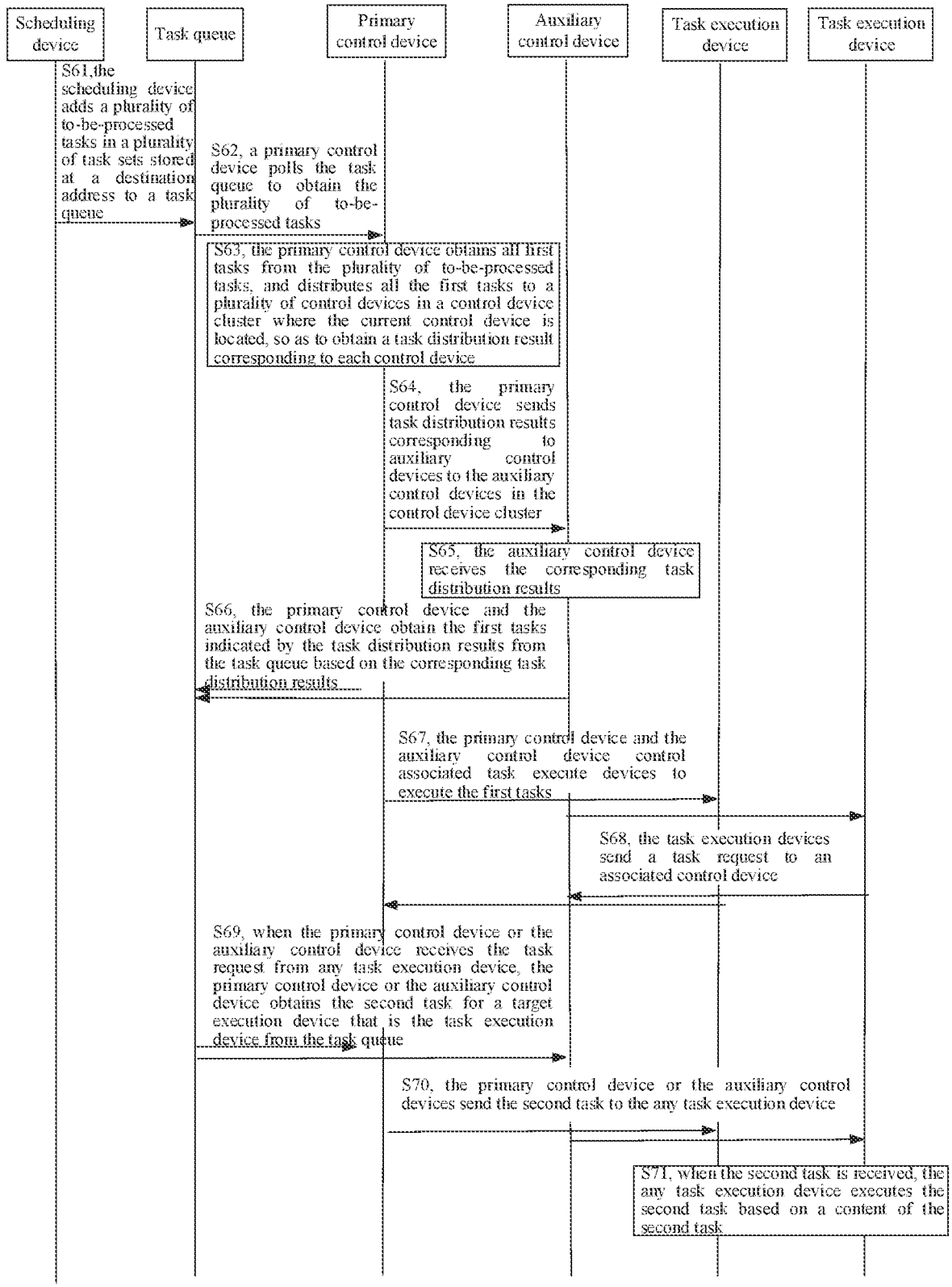
FIG. 6 is a flow diagram of a task execution method shown according to an exemplary embodiment.

FIG. 6 is a flow diagram of a task execution method shown according to an exemplary embodiment. In the embodiment of the present disclosure, interaction flows between the scheduling devices, the control devices, the task execution devices and the task queue (a device where the task queue is located in the storage device) are illustrated in detail only by taking an example that the implement environment of the task execution method is the above third implement environment. Referring to FIG. 6, the method may include the following steps.

In step S61, the scheduling device adds a plurality of to-be-processed tasks in a plurality of task sets stored at a destination address to the task queue.

In the embodiment of the present disclosure, the destination address is an address of the agent where the above task execution platform is located, the user may submit the task or a batch of tasks on the task execution platform, the batch of tasks is called the task set here, and the task set may further be called the job. After the user submits the task, the scheduling device may distribute the plurality of task sets stored at the destination address to the control device.

In some embodiments, there may be the plurality of scheduling devices, and the plurality of scheduling devices may obtain the task set in a preemptive mode, and add the plurality of obtained to-be-processed tasks in the task set to the task queue. The task queue includes the plurality of to-be-processed tasks. In this process, by disposing the plurality of scheduling devices, the concurrent degree of the job may be improved, and then task processing efficiency is improved. In addition, all the tasks are stored in the task queue, so that data consistency may be ensured.

In step S62, a primary control device polls the task queue to obtain the plurality of to-be-processed tasks.

The implement environment of the task execution method may include the plurality of control devices. In some embodiments, the plurality of control devices may be a control device cluster, the control device cluster include one primary control device and at least one auxiliary control device, and the primary control device is configured to distribute the first task. An execution mode of the first task is a mode for controlling the task execution device by the control device to execute the task, that is to say, the execution mode of the first task is a remote execution mode. Therefore, the primary control device may poll the task queue to obtain the plurality of to-be-processed tasks. Through design of a primary-auxiliary architecture, the primary control device may regularly inspect a survival state of the auxiliary control devices. Once the primary control device is down, one of the plurality of auxiliary control devices may be selected as a new primary control device to continue to normally work, thereby improving availability and an error-tolerant rate of the task execution method.

The plurality of to-be-processed tasks are obtained by adding, by a plurality of devices, the plurality of to-be-processed tasks in the plurality of task sets stored at the destination address to the task queue. In the embodiment of the present disclosure, the plurality of devices are the plurality of scheduling devices. In other implement environments, the plurality of devices may further be the plurality of control devices, which is not limited by the embodiment of the present disclosure.

In some embodiments, the primary control device may periodically poll the task queue. That is to say, the primary control device may poll the task queue every first preset duration to obtain the plurality of to-be-processed tasks, so that the following steps are executed to implement the task execution process. The first preset duration may be set by related technical staff according to needs, which is not limited by the embodiment of the present disclosure.

Step S61 and step S62 are processes of obtaining the plurality of to-be-processed tasks, in the processes, description is only made by taking an example that the plurality of to-be-processed tasks are the tasks in the task queue, and certainly, the task queue may not be set, which is not limited by the embodiment of the present disclosure. After the plurality of to-be-processed tasks are obtained, how to execute the plurality of to-be-processed tasks may be determined.

In step S63, the primary control device obtains all first tasks from the plurality of to-be-processed tasks, and distributes all the first tasks to the plurality of control devices in the control device cluster where the current control device is located, so as to obtain a task distribution result corresponding to each control device.

After obtaining the plurality of to-be-processed tasks, the primary control device may obtain the first tasks from the plurality of to-be-processed tasks, and distribute the first tasks to obtain the task distribution result. In some embodiments, the primary control device may equally distribute all the first tasks to the plurality of control devices in the control device cluster where the current control device is located.

When distributing the tasks to the plurality of control devices in the control device cluster, the primary control device may distribute the tasks to all the auxiliary control devices in the control device cluster, but not to itself. Or, the primary control device may distribute the tasks to all the control devices in the control device cluster, wherein the control devices include the primary control device. Certainly, the primary control device may further distribute all the first tasks to part of the control devices based on a load condition of the plurality of control devices in the control device cluster. Which implementation is specifically adopted is not limited by the embodiment of the present disclosure, and the following description is made only on the basis that the primary control device distributes the tasks to all the control devices in the control device cluster.

In some embodiments, a data structure of the plurality of to-be-processed tasks may include an execution mode field, the primary control device may read the execution mode field and determine whether each to-be-processed task is the first task according to the execution mode field.

In step S64, the primary control device sends task distribution results corresponding to the auxiliary control devices to the auxiliary control devices in the control device cluster.

After distributing the first task, the primary control device may send the task distribution results to all the auxiliary control devices, and all the auxiliary control devices continue the subsequent task execution step based on the task distribution results.

In step S65, the auxiliary control device receives the corresponding task distribution result.

In step S66, the primary control device and the auxiliary control device obtain the first tasks indicated by the task distribution results from the task queue based on the corresponding task distribution results.

As for the primary control device, the primary control device may obtain the first task indicated by the task distribution result corresponding to the primary control device from the plurality of to-be-processed tasks based on the task distribution result corresponding to the primary control device. As for the auxiliary control device, the auxiliary control device may obtain the first task indicated by the task distribution result corresponding to the auxiliary control device from the plurality of to-be-processed tasks based on the task distribution result corresponding to the auxiliary control device.

In above step S63, the primary control device may distribute the first tasks to the primary control device and the auxiliary control devices, or distribute the first tasks only to the auxiliary control devices. In step S66, description is only made by taking an example that the first tasks are distributed to the primary control device and the auxiliary control devices. If the primary control device only distributes the first tasks to the auxiliary control devices, step S66 may be: the auxiliary control device obtains the first task indicated by the task distribution result from the task queue based on the task distribution result corresponding to the auxiliary control device.

In step S67, the primary control device and the auxiliary control device control the associated task execute devices to execute the first tasks.

After obtaining the first tasks needing to be executed, the primary control device and the auxiliary control device may control the associated task execute devices to execute the first tasks. An execution mode of the first tasks is the remote execution mode, and the primary control device and the auxiliary control device may respectively control the associated task execute devices to execute the first tasks.

In some embodiments, a remote control process may be implemented through an SSH command. Specifically, from the perspective of one control device, the current control device may be the primary control device or the auxiliary control device, and the current control device may establish connection with the task execution devices associated with the current control device based on the SSH command, and control the task execution device successfully connected with the current control device to execute the first task.

Accordingly, in step S67, the first tasks may be executed on one side of the task execution device based on control instructions of the associated control device. That is to say, the task execution steps conducted on one side of the task execution device is controlled by the control device.

It should be noted that above steps S63-S67 are processes of obtaining the first task in the plurality of to-be-processed tasks and controlling the task execution device associated with the current control device to execute the first task, and because the execution mode of the first task is the remote execution mode, the control device needs to remotely control the task execution device to execute the first task. In some embodiments, in addition to the remote execution mode, the task execution mode further includes another execution mode, called a local execution mode here, and the local execution mode is a mode of executing the task by the task execution device on its own. The task with the execution mode being the local execution mode is a second task. An execute process of the second task may refer to following steps S68-S71, which is not repeated here.

In step S68, the task execution devices send a task request to the associated control device.

The task execution device may send the task request to the associated control device so as to request the second task needing to be executed by the task execution device.

In some embodiments, the task execution device may periodically send the task request to the control device. The task request carries identification information of the current task execution device, that is to say, the task request is periodically sent by any task execution device, and the task request carries the identification information of any task execution device.

The task execution device may send the task request to the associated control device every second preset duration. The second preset duration may be set by related technical staff according to needs, which is not limited by the embodiment of the present disclosure.

In step S69, when the primary control device or the auxiliary control device receives the task request from any task execution device, the primary control device or the auxiliary control device obtains the second task for a target execution device that is the task execution device from the task queue.

Both the primary control device and the auxiliary control device may receive the task request sent by the task execution device associated therewith, so as to obtain the second task needing to be executed by it (them) from the task queue after receiving the task request.

In some embodiments, a data structure of the plurality of to-be-processed tasks may include an execution mode field, the primary control device or the auxiliary control device may read the execution mode field and determine whether each to-be-processed task is the second task according to the execution mode field.

In a specific possible embodiment, the primary control device or the auxiliary control device may determine whether each second task is the second task of the any task execution device according to the identification information of the task execution device. Specifically, the primary control device or the auxiliary control device may match the identification information of the any task execution device with identification information of the target task execution device in the plurality of to-be-processed tasks, so as to obtain the second task corresponding to the matched identification information.

In one possible embodiment, the task execution device may further send a task completion condition to the associated primary control device or auxiliary control devices, a status of each task in the task completion condition is a successful status or a failure status, and the task completion condition includes a failure reason of the task with the status being the failure status. Then the primary control device or the auxiliary control devices may receive the task completion condition of the any task execution device, and updates the statuses of the plurality of to-be-processed task based on the task completion condition. For example, the status of the task may be changed into processed, or the processed task may be removed from the task queue.

As for the task with the failure status, whether it is a device reason or a human reason may be analyzed according to the failure reason, and then is fed back to the user. Certainly, a device status may further be obtained by analysis according to the task completion condition. In some embodiments, when it is determined that the statuses of the tasks of a target quantity are failure statuses in a first target duration according to the task completion condition, the primary control device or the auxiliary control device sends warning information. In this way, in the task execution process, the related technical staff may troubleshoot errors according to the warning information in time, so as to continue to execute the process of the task execution method, thereby improving the processing efficiency.

In step S70, the primary control device or the auxiliary control device sends the second task to the any task execution device.

Because the execution mode of the second task is the local execution mode, namely the mode of executing the task by the task execution device on its own, the primary control device or the auxiliary control device may directly send the second task to the any task execution device without remotely controlling task execution.

Steps S68-S70 are processes that when the task request is received from any task execution device, the second task for the target task execution device which any task execution device is obtained from the plurality of to-be-processed tasks, and the second task is sent to the any task execution device. In the embodiment of the present disclosure, the task execution device supports the two execution modes at the same time, the two execution modes are compatible, a more flexible task execution service is provided, the user may randomly submit the tasks with the two execution modes, the tasks may all be processed by the processes of the task execution method, and universality is high.

In step S71, when the second task is received, the any task execution device executes the second task based on a content of the second task.

After above step S62, each to-be-processed task may further be set with a survival time, namely, a second target duration. When a duration from a system time to a generation time of any to-be-processed task is the second target duration and the to-be-processed task is not distributed or not obtained yet, the primary control device, the auxiliary control devices or the storage device where the task queue is located may set the status of the to-be-processed task as a delivery timeout status.

As for the task execution device, when the duration from the system time to the generation time of any to-be-processed task is the second target duration and the to-be-processed task is not executed or not completely executed yet, the task execution device may further set the status of the to-be-processed task as an execution timeout status. The fine control ability on the time out may be improved through the above two timeout statuses.

In some embodiments, the plurality of to-be-processed tasks are provided with various formats. In a process that the above primary control device and the auxiliary control device control the task execution device to execute the first task or the task execution device executes the second task, the first task or the second task may be executed according to a format of the first task or of the second task and according to an execution mode corresponding to the format. Compared with a situation in the related art that only one format is supported and a user needs to be familiar with the basic grammar of a specific format to use, the more formats are provided, using is flexible, and universality of the task execution method is improved.

It should be noted that the processes of above steps S63-S67 and the processes of above steps S68-S70 may be implemented by adopting any time sequence, that is to say, the processes of above steps S63-S67 and the processes of above steps S68-S70 are independent, or may be executed one after the other, or may be executed at the same time, which is not limited by the embodiment of the present disclosure.

In the related art, large-scale concurrency performance depends on an underlying tool system, the quantity of agents for batch operations reaches a ten-thousand level, and thus a performance bottleneck will occur. Whereas the task execution method provided by the embodiment of the present disclosure does not need to depend on the underlying tool system, operational and maintenance costs may be reduced, the quantity of the devices may be increased on its own according to using needs, and the concurrent ability is improved. Through the three-layer architecture of the scheduling devices, the control devices and the task execution devices, all layers are independently deployed without influence on each other, thereby reducing coupling.

Figure 7:
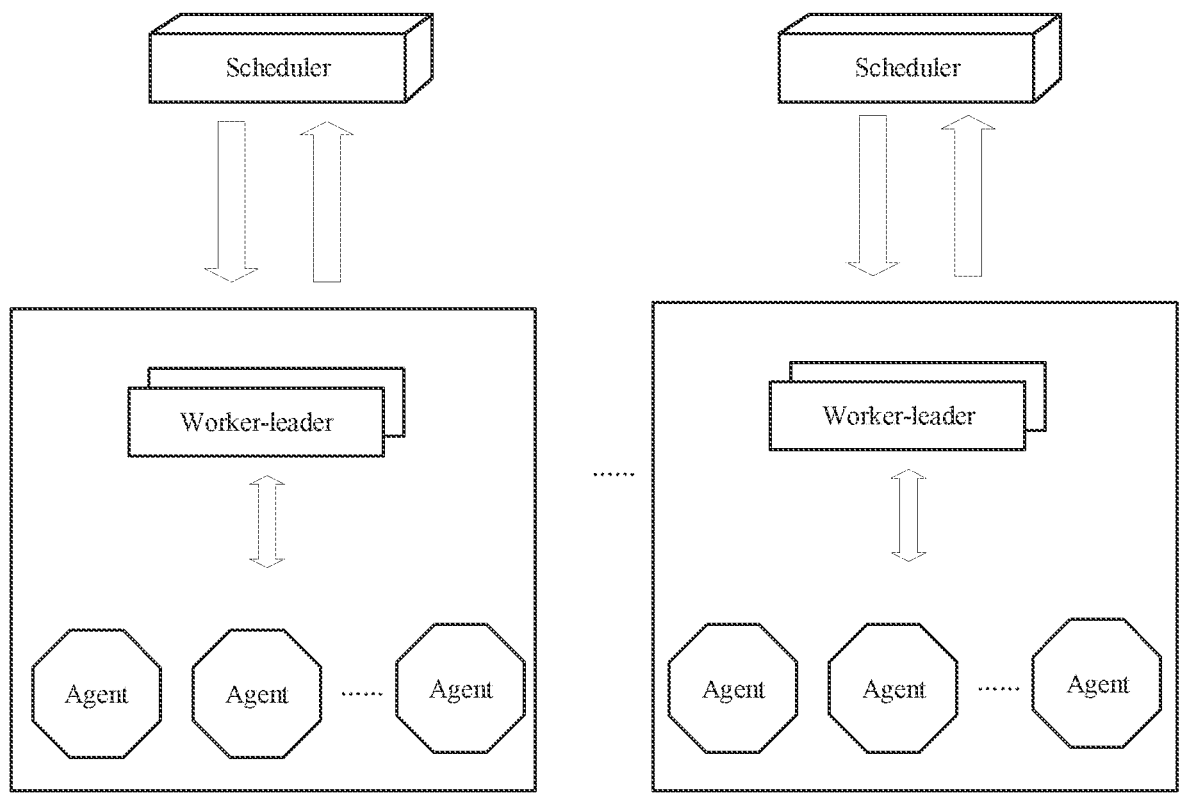
FIG. 7 is a schematic architecture diagram of a task execution system shown according to an exemplary embodiment.
Figure 8:
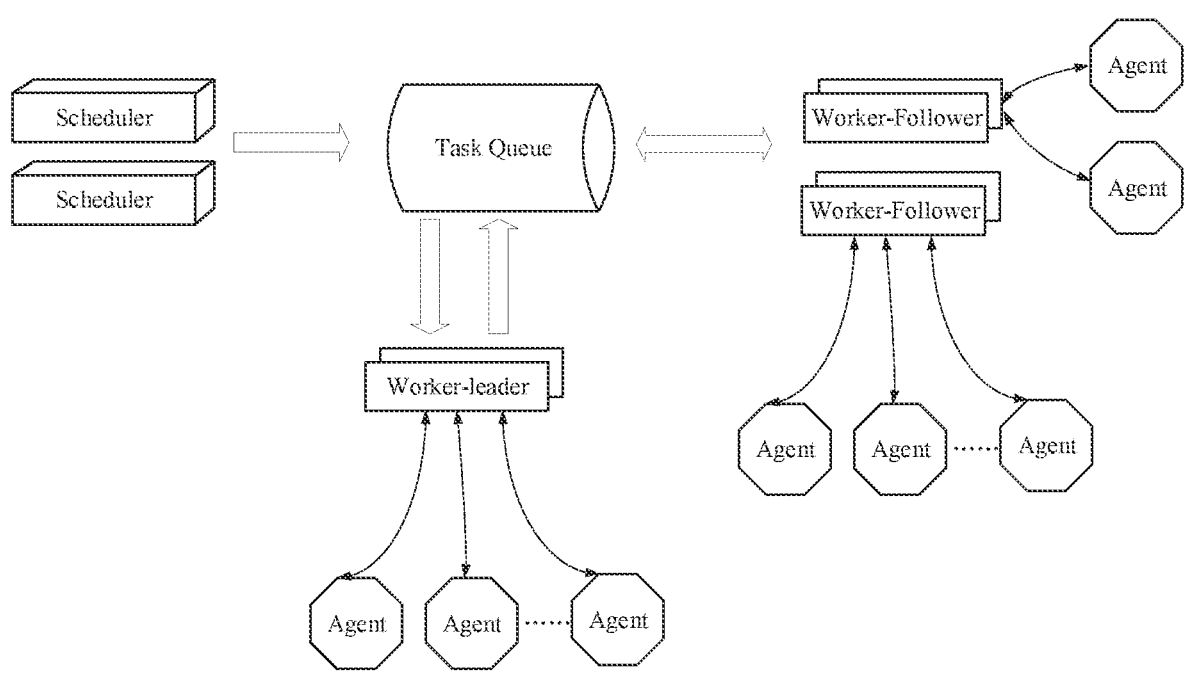
FIG. 8 is a flow diagram of a task execution method shown according to an exemplary embodiment.

The specific flows of the above task execution method are illustrated below through a specific example. Referring to FIG. 7 and FIG. 8, the architecture of the task execution method may be divided into three layers: a Scheduler layer, a Worker layer and an Agent layer.

As for the Scheduler layer, a core component of the Scheduler layer is a Scheduler (may be deployed to a scheduling device), mainly responsible for preemption and schedule of the job. A job scheduling cluster deploys a plurality of Schedulers, regardless of primary and secondary, all the Schedulers adopt preemptive job scheduling, thereby improving the job scheduling efficiency and ensuring availability of the layer.

As for the Worker layer, a core component of the Worker layer is a Worker (namely, the control device), mainly responsible for issuing of the task of the local execution mode and execution of the task of the remote execution mode. The Worker may specifically adopt a mode of a Worker cluster, the Worker cluster adopts a primary-auxiliary architecture, a primary node (Worker-leader, namely, the primary control device) is responsible for regularly inspecting a survival condition of an auxiliary node (Worker-follower, namely, the auxiliary control device), and meanwhile, a certain distribution algorithm is adopted to evenly distribute the task of the remote execution mode to all the Workers.

As for the Agent layer, the Agent layer is composed of an Agent component, and an Agent progress needs to be deployed on each task execution device and is responsible for task obtaining and execution. The Agent progress will automatically register to the Worker cluster after starting, to obtain a to-be-executed task (the local execution mode) list and start an execution program locally.

Referring to FIG. 8, the specific flow of the task execution method may be: the Scheduler is responsible for job (task set) preemption and scheduling, as long as the user submits the job, the Scheduler will preempt the newly-submitted job, and then the newly-submitted job is split into the plurality of tasks according to an agent list (hosts field) of the job to be sent to task queue. The agent list refers to a task execution device list, and description is made only by taking an example that the task execution device is an agent.

As for the tasks with the remote execution mode, the Worker leader will poll the task queue continuously, inquires the tasks of the remote execution mode according to the execution mode (ExecuteMode field) of the tasks in the queue, and then the tasks are evenly distributed to all the Workers in a current system. After obtaining the remotely-executed task, each Worker will log in a remote agent through an SSH command to execute the task, and a specific logic is as follows.

1. A script package of the job is downloaded according to a jobID in the task.
2. The package is copied to the target agent and decompressed.
3. The target agent is remotely logged in.
4. An account is switched and an execution command is started.
5. A task timeout inspection thread is started.
6. If the task times out, task execution is terminated, otherwise, after task execution is finished, the task is removed from the queue, an execution result is saved, and a task status is updated.

As for a locally executed task, the Agent registers to the Worker every one second, and sends a heartbeat request. The request sent every time includes the following contents.

Hostname: a host name of the current agent.

IP: an IP address of the current agent.

FinishedTask: a task list currently executed completely (success or failure).

The specific flow of task issuing and task execution is as follows.

1. The Worker removes the task reported by the Agent from the queue, updates the task status, and save the execution result.

2. The Worker inquires and returns the task of the Agent from the queue according to Hostname and IP of the Agent.

3. After the Agent obtains the new task, a task executor is started.

4. The task executor downloads the script package locally and decompresses the package.

5. A configuration file in the script package is read to obtain job configuration (an execution account, a parameter, and timeout).

6. An account is switched and the command is executed.

7. Timeout inspection is started, and if command execution times out, the task is terminated. Otherwise, after execution is finished, the task is reported to the Worker.

Based on the above three-layer architecture design, a distributed batch task issuing and execution system is implemented, the operational and maintenance efficiency is greatly improved, and the problems that some operational and maintenance engineers lack platform support, and operational and maintenance operations cannot be accumulated, shared, managed and controlled are solved. The system composed of the three layers serves as the most bottom layer and most basic part of the overall operational and maintenance platform, specific details of operations of the underlying task execution device are hidden, and a unified application programming interface (API) for operating the task execution device is provided for an upper platform in a friendlier mode. In addition, one batch operation is encapsulated in the form of the job, a basic and system-level batch concurrency control ability on the task execution device is provided, and meanwhile, a fine control ability on the job concurrent degree, fault tolerance and timeout is provided. Through the system, an operation entry on the task execution device may be unified, the batch operation of the task execution device is converged on the system in a unified mode, operations on the task execution device are normalized, and supports are provided for security audit, accident tracking and command review.

As for the plurality of obtained to-be-processed tasks in the embodiment of the present disclosure, the first task needing to be executed by the control device may be selected, then the task execution device is controlled to execute the first task, and the second task needing to be executed by the task execution device on its own may also be sent to the corresponding task execution device. That is to say, the two execution modes are supported at the same time and are compatible, a more flexible task execution service is provided, the user may randomly submit the tasks with the two execution modes, and the tasks may all be processed by the processes of the task execution method. Therefore, the above task execution method is high in universality.

Figure 9:
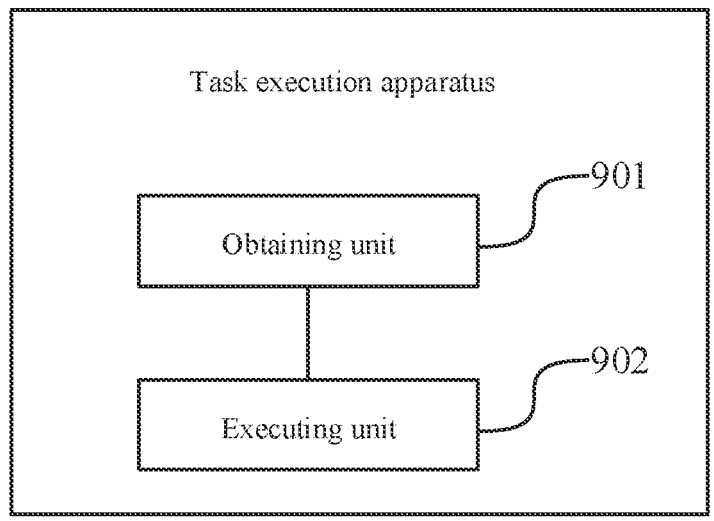
FIG. 9 is a block diagram of a task execution apparatus shown according to an exemplary embodiment.

FIG. 9 is a block diagram of a task execution apparatus shown according to an exemplary embodiment. Referring to FIG. 9, the apparatus includes: an obtaining unit 901, configured to obtain a plurality of to-be-processed tasks; and an executing unit 902, configured to obtain a first task in the plurality of to-be-processed tasks, and control a task execution device associated with a current control device to execute the first task, wherein an execution mode of the first task is a mode for controlling the task execution device by a control device to execute a task.

The executing unit 902 is further configured to: in response to a task request received from one task execution device, obtain a second task for a target task execution device which is the any task execution device from the plurality of to-be-processed tasks, and send the second task to the any task execution device, wherein an execution mode of the second task is a mode for executing a task by the task execution device on its own.

In some embodiments, the task execution apparatus is applied to a control device cluster, the control device cluster includes a primary control device and at least one auxiliary control device, and the primary control device is configured to distribute the first task.

In some embodiments, the task execution apparatus further includes: a distributing unit, configured to: when the current control device is the primary control device, obtain all first task from the plurality of to-be-processed tasks, distribute all the first tasks to the plurality of control devices in the control device cluster where the current control device is located to obtain a task distribution result corresponding to each control device; and send the task distribution results corresponding to the auxiliary control devices to the auxiliary control devices in the control device cluster.

The executing unit 902 is configured to: obtain the first task indicated by a task distribution result corresponding to the primary control device from the plurality of to-be-processed tasks based on the task distribution result corresponding to the primary control device.

In some embodiments, the task execution apparatus further includes: a first receiving unit, configured to: when the current control device is the auxiliary control device, receive the task distribution result sent by the primary control device.

The executing unit 902 is configured to obtain the first task indicated by the task distribution result corresponding to the auxiliary control device from the plurality of to-be-processed tasks based on the task distribution result corresponding to the auxiliary control device.

In some embodiments, the obtaining unit 901 is configured to obtain the plurality of to-be-processed tasks by polling the task queue; the executing unit 902 is configured to obtain the first task from the task queue; and the executing unit 902 is configured to obtain the second task for the target task execution device which is the any task execution device from the task queue.

In some embodiments, the plurality of to-be-processed tasks are obtained by adding, by a plurality of devices, the plurality of to-be-processed tasks in a plurality of task sets stored at a destination address to the task queue.

In some embodiments, the executing unit 902 is configured to establish connection with the task execution device associated with the current control device based on a secure shell (SSH) command, and control a task execution device successfully connected with the current control device to execute the first task.

In some embodiments, the task request is periodically sent by any task execution device, and the task request carries identification information of the any task execution device.

The executing unit 902 is configured to match the identification information of the any task execution device with identification information of the target task execution device in the plurality of to-be-processed tasks; and obtain the second task corresponding to the matched identification information.

In some embodiments, the task execution apparatus further includes: a second receiving unit, configured to receive a task completion condition of the any task execution device; and an updating unit, configured to update statuses of the plurality of to-be-processed tasks based on the task completion condition.

In some embodiments, the task execution apparatus further includes: a sending unit, configured to send warning information in response to that it is determined that the statuses of tasks of a target quantity are failure statuses in a first target duration according to the task completion condition.

In some embodiments, the task execution apparatus further includes: a setting unit, configured to, in response to that a duration from a system time to a generation time of any to-be-processed task is a second target duration and the to-be-processed task is not distributed or not obtained yet, set the status of the to-be-processed task as a delivery timeout status.

In some embodiments, the plurality of to-be-processed tasks are provided with various formats.

With respect to the apparatus in the above embodiment, the specific modes for executing operations by all the modules and the beneficial effects have been described in detail in the embodiment related to the method, which will not be illustrated in detail here.

Figure 10:
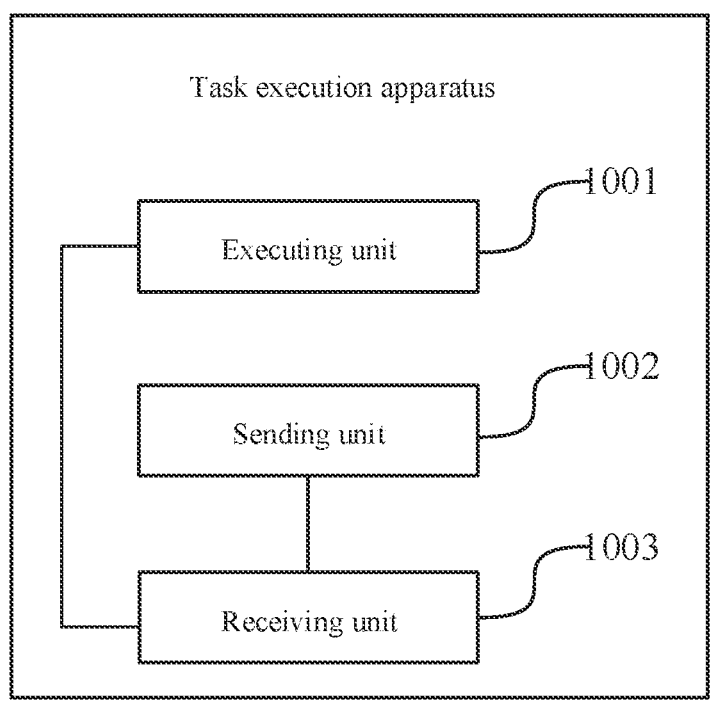
FIG. 10 is a block diagram of a task execution apparatus shown according to an exemplary embodiment.

FIG. 10 is a block diagram of a task execution apparatus shown according to an exemplary embodiment. Referring to FIG. 10, the apparatus includes: an executing unit 1001, configured to execute a first task based on a control instruction of a control device associated with the task execution device, wherein an execution mode of the first task is a mode for controlling a task execution device by the control device to execute a task; a sending unit 1002, configured to send a task request to the control device, wherein the task request is configured to request a second task needing to be executed by a current task execution device, and an execution mode of the second task is a mode for executing the task by the task execution device on its own; and a receiving unit 1003, configured to receive the second task for the target task execution device which is the current task execution device.

The executing unit 1001 is further configured to execute the second task based on a content of the second task.

In some embodiments, the task execution apparatus further includes: a setting unit, configured to, in response to that a duration from a system time to a generation time of any to-be-processed task is a third target duration and the to-be-processed task is not executed or not completely executed yet, set a status of the to-be-processed task as an execution timeout status.

In some embodiments, the executing unit 1001 is configured to execute the first task or the second task according to a format of the first task or of the second task and according to an execution mode corresponding to the format.

In some embodiments, the sending unit 1002 is configured to periodically send a task request to the control device, wherein the task request carries identification information of the current task execution device.

In some embodiments, the sending unit 1002 is further configured to send a task completion condition to the control device, wherein a status of each task in the task completion condition is a successful status or a failure status, and the task completion condition includes a failure reason of the task with the status being the failure status.

With respect to the apparatus in the above embodiment, the specific modes for executing operations by all the modules and the beneficial effects have been described in detail in the embodiment related to the method, which will not be illustrated in detail here.

Figure 11:
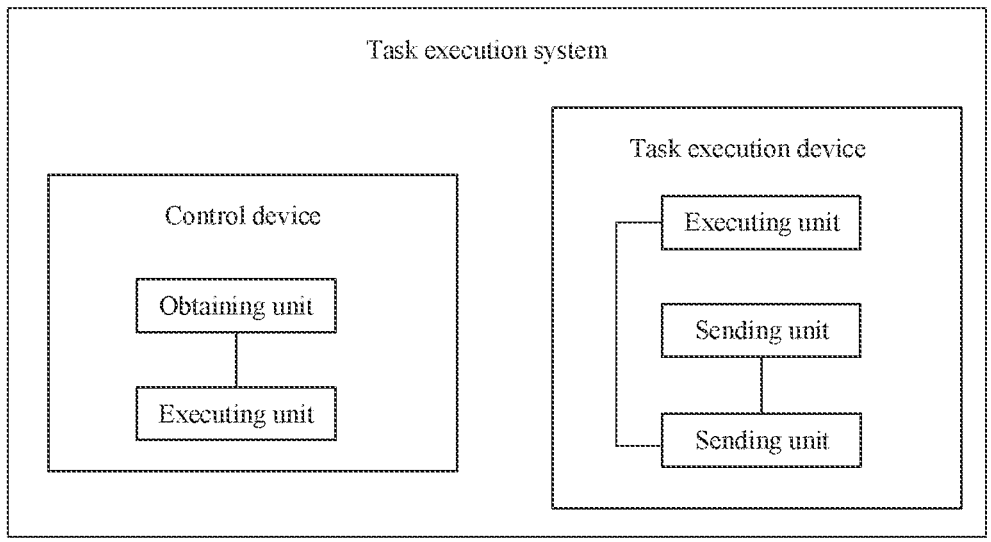
FIG. 11 is a structure block diagram of a task execution system shown according to an exemplary embodiment.

FIG. 11 is a structure block diagram of a task execution system shown according to an exemplary embodiment. Referring to FIG. 11, the task execution system may include a control device and a task execution device. The control device may be deployed with the task execution apparatus shown in above FIG. 9, or the control device is the task execution apparatus shown in above FIG. 9. The task execution device may be deployed with the task execution apparatus shown in above FIG. 10, or the task execution device is the task execution apparatus shown in above FIG. 10. The control device and the task execution device are configured to execute operations executed by the task execution method in the above method embodiments.

Figure 12:
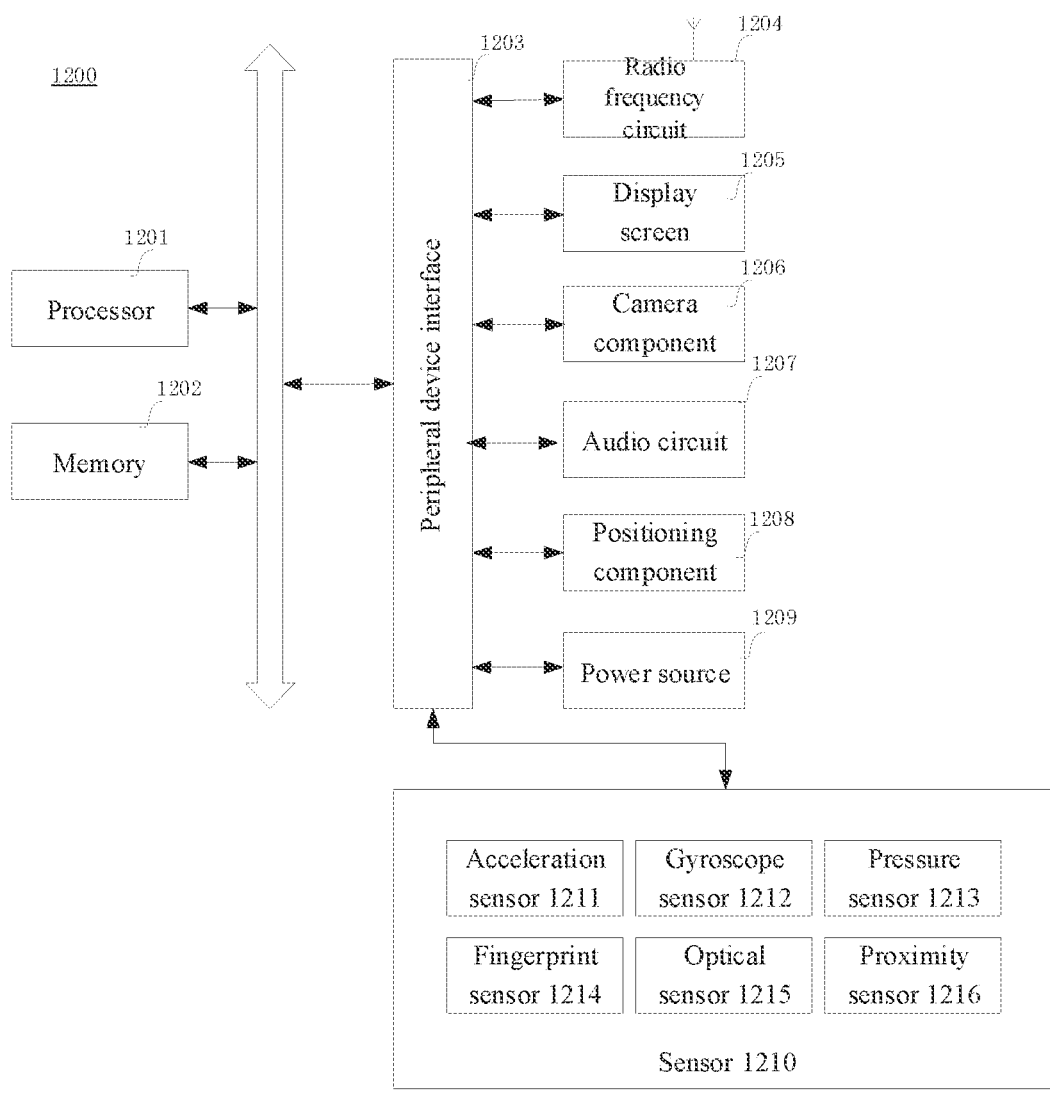
FIG. 12 is a structure block diagram of a terminal shown according to an exemplary embodiment.

FIG. 12 is a structure block diagram of a terminal shown according to an exemplary embodiment. The terminal 1200 may be: a smart phone, a tablet computer, a Moving Picture Experts Group Audio Layer III (MP3) player, a Moving Picture Experts Group Audio Layer IV (MP4) player, a notebook computer or a desktop computer. The terminal 1200 may further be possibly called other names such as user equipment, a portable terminal, a laptop terminal, and a desktop terminal.

Usually, the terminal 1200 includes: a processor 1201 and a memory 1202.

The processor 1201 may include one or more processing cores, for example, a 4-core processor, an 8-core processor and the like. The processor 1201 may be implemented by at least one hardware form of Digital Signal Processing (DSP), a Field-Programmable Gate Array (FPGA), or a Programmable Logic Array (PLA). The processor 1201 may also include a main processor and a coprocessor. The main processor is a processor configured to process data in a wakeup status, and is also called a Central Processing Unit (CPU). The coprocessor is a low-power-consumption processor configured to process data in a standby status. In some embodiments, the processor 1201 may be integrated with a Graphics Processing Unit (GPU), and the GPU is configured to be responsible for rendering and drawing contents needing to be displayed by a display screen. In some embodiments, the processor 1201 may further include an Artificial Intelligence (AI) processor, and the AI processor is configured to process computing operations related to machine learning.

The memory 1202 may include one or more computer readable storage mediums, and the computer readable storage mediums may be non-transient. The memory 1202 may further include a high-speed random access memory and a nonvolatile memory, for example, one or more disk storage devices and flash memory devices. In some embodiments, the non-transient computer readable storage mediums in the memory 1202 are configured to store at least one instruction, and the at least one instruction is configured to be executed by the processor 1201 so as to implement the task execution method provided by the method embodiment in the present disclosure.

In some embodiments, the terminal 1200 may further optionally include: a peripheral device interface 1203 and at least one peripheral device. The processor 1201, the memory 1202 and the peripheral device interface 1203 may be connected through a bus or a signal line. All the peripheral devices may be connected with the peripheral device interface 1203 through a bus, a signal line or a circuit board. Specifically, the peripheral device includes: at least one of a radio frequency circuit 1204, a touch display screen 1205, a camera component 1206, an audio circuit 1207, a positioning component 1208 or a power source 1209.

The peripheral device interface 1203 may be configured to connect at least one peripheral device related to Input/Output (I/O) to the processor 1201 and the memory 1202. In some embodiments, the processor 1201, the memory 1202 and the peripheral device interface 1203 are integrated on the same chip or circuit board. In some other embodiments, any one or two of the processor 1201, the memory 1202 and the peripheral device interface 1203 may be implemented on the separate chip or circuit board, which is not limited by the present embodiment.

The radio frequency circuit 1204 is configured to receive and transmit a Radio Frequency (RF) signal, also called an electromagnetic signal. The radio frequency circuit 1204 communicates with a communication network and other communication devices through the electromagnetic signal. The radio frequency circuit 1204 converts an electric signal into the electromagnetic signal to be sent, or converts the received electromagnetic signal into the electric signal. Optionally, the radio frequency circuit 1204 includes: an antenna system, an RF transceiver, one or more amplifiers, a tuner, an oscillator, a digital signal processor, a coding and decoding chipset, a subscriber identity module card and the like. The radio frequency circuit 1204 may communicate with other terminals through at least one wireless communication protocol. The wireless communication protocol includes but is not limited to: a metropolitan area network, all generations of mobile communication networks (2G, 3G, 4G and 5G), a wireless local area network and/or Wireless Fidelity (WiFi) network. In some embodiments, the radio frequency circuit 1204 may further include a circuit related to Near Field Communication (NFC), which is not limited by the present disclosure.

The display screen 1205 is configured to display a User Interface (UI). The UI may include graphics, texts, icons, videos and any combination thereof. When the display screen 1205 is a touch display screen, the display screen 1205 further has an ability of collecting a touch signal on or above a surface of the display screen 1205. The touch signal may serve as a control signal to be input into the processor 1201 to be processed. At the moment, the display screen 1205 may further be configured to provide a virtual button and/or a virtual keyboard, also called a soft button and/or a soft keyboard. In some embodiments, there may be one display screen, disposed on a front panel of the terminal 1200; in some other embodiments, there may be at least two display screens 1205, respectively disposed on different surfaces of the terminal 1200 or designed in a folding mode; and in some further embodiments, the display screen 1205 may be a flexible display screen, disposed on a curved surface or a folding surface of the terminal 1200. Even, the display screen 1205 may further be disposed into nonrectangular irregular figures, namely, a special-shaped screen. The display screens 1205 may be prepared from the materials such as a Liquid Crystal Display (LCD) and an Organic Light-Emitting Diode (OLED).

The camera component 1206 is configured to collect images or videos. Optionally, the camera component 1206 includes a front camera and a rear camera. Usually, the front camera is disposed on a front panel of the terminal, and the rear camera is disposed on the back of the terminal. In some embodiments, there are at least two rear cameras, which are any one of a main camera, a depth-of-field camera, a wide-angle camera and a telephoto camera, so as to achieve that the main camera and the depth-of-field camera are fused to realize a bokeh function, and the main camera and the wide-angle camera are fused to realize a panorama shot and Virtual Reality (VR) shooting function or other fusion shooting functions. In some embodiments, the camera component 1206 may further include a flash lamp. The flash lamp may be a monochromatic-temperature flash lamp or a double-color-temperature flash lamp. The double-color-temperature flash lamp refers to a combination of a warm-light flash lamp and a cold-light flash lamp, and may be used for light compensation under different color temperatures.

The audio circuit 1207 may include a microphone and a loudspeaker. The microphone is configured to collect sound waves of a user and an environment, and convert the sound waves into an electric signal to be input to the processor 1201 to be processed, or input to the radio frequency circuit 1204 to realize voice communication. For the purpose of stereo collecting or noise reduction, there may be the plurality of microphones respectively disposed at different parts of the terminal 1200. The microphone may further be an array microphone or an omnidirectional collecting microphone. The loudspeaker is configured to convert an electric signal from the processor 1201 or the radio frequency circuit 1204 into the sound waves. The loudspeaker may be a traditional wafer speaker or a piezoelectric ceramic loudspeaker. When the loudspeaker is the piezoelectric ceramic loudspeaker, the electric signal may be converted into the sound waves that can be heard by human, or be converted into sound waves that cannot be heard by human for ranging and other purposes. In some embodiments, the audio circuit 1207 may further include a headset j ack.

The positioning component 1208 is configured to position a current geographic location of the terminal 1200 so as to realize navigation or a Location Based Service (LBS). The positioning component 1208 may be a positioning component based on the Global Positioning System of the United States, the Beidou system of China, the Glonass system of Russia, or the Galileo system of the European Union.

The power source 1209 is configured to supply power to all components in the terminal 1200. The power source 1209 may be alternating current, direct current, a primary battery or a rechargeable battery. When the power source 1209 includes the rechargeable battery, the rechargeable battery may support wired charging or wireless charging. The rechargeable battery may further be configured to support a quick charge technology.

In some embodiments, the terminal 1200 further includes one or more sensors 1210. The one or more sensors 1210 include but are not limited to: an acceleration sensor 1211, a gyroscope sensor 1212, a pressure sensor 1213, a fingerprint sensor 1214, an optical sensor 1215 and a proximity sensor 1216.

The acceleration sensor 1211 may detect the magnitude of acceleration on three coordinate axes of a coordinate system established with the terminal 1200. For example, the acceleration sensor 1211 may be configured to detect a component of a gravitational acceleration on the three coordinate axes. The processor 1201 may control the touch display screen 1205 to display a user interface in a transverse view or a longitudinal view according to gravitational acceleration signals collected by the acceleration sensor 1211. The acceleration sensor 1211 may further be configured to collect movement data of a game or a user.

The gyroscope sensor 1212 may detect a machine body direction and a rotating angle of the terminal 1200, and the gyroscope sensor 1212 and the acceleration sensor 1211 may synergistically collect 3D motions of the user to the terminal 1200. The processor 1201 may realize the following functions according to data collected by the gyroscope sensor 1212: motion sensing (for example, changing a UI according to a tilt operation of the user), image stabilizing during shooting, game control and inertial navigation.

The pressure sensor 1213 may be disposed on a side border of the terminal 1200 and/or a lower layer of the touch display screen 1205. When the pressure sensor 1213 is disposed on the side border of the terminal 1200, a holding signal of a user on the terminal 1200 may be detected, and the processor 1201 performs left hand and right hand recognition or shortcut actions according to the holding signal collected by the pressure sensor 1213. When the pressure sensor 1213 is disposed on the lower layer of the touch display screen 1205, the processor 1201 controls operable controls on an UI interface according to a pressure operation of the user on the touch display screen 1205. The operable controls include at least one of a button control, a scroll-bar control, an icon control or a menu control.

The fingerprint sensor 1214 is configured to collect fingerprints of the user, and the processor 1201 recognizes an identity of the user according to the fingerprints collected by the fingerprint sensor 1214, or the fingerprint sensor 1214 recognizes the identity of the user according to the collected fingerprints. When it is recognized that the identity of the user is a trusted identity, the processor 1201 authorizes the user to execute related sensitive operations, and the sensitive operations include unlocking a screen, viewing encrypted information, downloading software, paying, changing settings, and the like. The fingerprint sensor 1214 may be disposed on a front face, a back face or a side face of the terminal 1200. When a physical button or a manufacturer Logo is disposed on the terminal 1200, the fingerprint sensor 1214 may be integrated with the physical button or the manufacturer Logo together.

The optical sensor 1215 is configured to collect ambient light intensity. In one embodiment, the processor 1201 may control a display brightness of the touch display screen 1205 according to the ambient light intensity collected by the optical sensor 1215. Specifically, when the ambient light intensity is high, the display brightness of the touch display screen 1205 is increased; and when the ambient light intensity is low, the display brightness of the touch display screen 1205 is decreased. In another embodiment, the processor 1201 may further dynamically adjust shooting parameters of the camera component 1206 according to the ambient light intensity collected by the optical sensor 1215.

The proximity sensor 1216 is also called a distance sensor, and is generally disposed on a front panel of the terminal 1200. The proximity sensor 1216 is configured to collect a distance between the user and the front face of the terminal 1200. In one embodiment, when the proximity sensor 1216 detects that the distance between the user and the front face of the terminal 1200 gradually becomes small, the processor 1201 controls the touch display screen 1205 to be switched from a screen-on status to a screen-off status; and when the proximity sensor 1216 detects that the distance between the user and the front face of the terminal 1200 gradually becomes large, the processor 1201 controls the touch display screen 1205 to be switched from the screen-off status to the screen-on status.

Those skilled in the art may understand that the structure shown in FIG. 12 does not constitute limitation to the terminal 1200, and may include components more or less than graphical representation, or combine certain components, or adopt different component arrangements.

Figure 13:
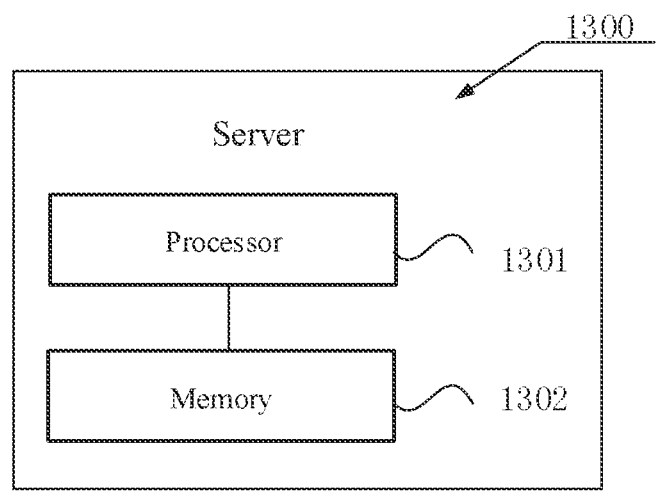
FIG. 13 is a schematic structural diagram of an agent shown according to an exemplary embodiment.

FIG. 13 is a schematic structural diagram of a server shown according to an exemplary embodiment. The server 1300 may generate a large difference due to different configuration or performance, and may include one or more central processing units (CPU) 1301 and one or more memories 1302. The memories 1302 store at least one instruction, and the at least one instruction is loaded and executed by the processing units 1301 so as to implement the task execution methods provided by the all the above method embodiments. Certainly, the server may further have parts such as a wired or wireless network interface, a keyboard and an input/output interface, so as to perform input/output. The server may further include other parts configured to implement device functions, which is not repeated here.

In an exemplary embodiment, a storage medium including an instruction is further provided, for example, a memory including an instruction, and the above instruction may be executed by a task execution device or a control device so as to complete the above task execution method. Optionally, the storage medium may be a non-temporary computer readable storage medium, for example, the non-temporary computer readable storage medium may be a Read-Only Memory (ROM), a Random Access Memory (RAM), a Compact Disc Read-Only Memory (CD-ROM), a magnetic tape, a floppy disk, an optical data storage device, and the like.

In an exemplary embodiment, a computer program product is further provided, including one or more instructions. The one or more instructions may be executed by a processor of a task execution device or a control device, so as to complete method steps of methods of the task execution device or the control device provided in the above embodiments.

What is claimed is:

1. A task execution method, executed by a control device cluster, wherein the control device cluster comprises a primary control device and at least one auxiliary control device, and the method comprises:

obtaining a plurality of to-be-processed tasks by acquiring, by a plurality of scheduling devices, a plurality of task sets stored at a destination address in a preemptive mode and adding the plurality of to-be-processed tasks in the plurality of task sets to a task queue, wherein a data structure of the plurality of to-be-processed tasks comprises an execution mode field, and the execution mode field is used to determine whether each of the plurality of to-be-processed task is a first task;

in response to a current control device being the primary control device, obtaining all first tasks from the plurality of to-be-processed tasks according to the execution mode field, and distributing all the first tasks to a plurality of control devices in the control device cluster, so as to obtain a task distribution result corresponding to each control device; and sending task distribution results corresponding to the auxiliary control devices to the auxiliary control devices in the control device cluster;

obtaining the first task in the plurality of to-be-processed tasks, and controlling a task execution device associated with the current control device to execute the first task, wherein an execution mode of the first task is a mode that the control device controls the task execution device to execute a task; and in response to the current control device being the primary control device, obtaining the first task indicated by a task distribution result corresponding to the primary control device from the plurality of to-be-processed tasks based on the task distribution result corresponding to the primary control device;

in response to a task request received from one task execution device, obtaining a second task for a target task execution device that is the one task execution device from the plurality of to-be-processed tasks, and sending the second task to the one task execution device, wherein an execution mode of the second task is a mode that the one task execution device executes a task by itself;

in response to the current control device being the auxiliary control device, receiving a task distribution result sent by the primary control device; and said obtaining the first task in the plurality of to-be-processed tasks, comprises:

obtaining the first task indicated by a task distribution result corresponding to the auxiliary control device from the plurality of to-be-processed tasks based on the task distribution result corresponding to the auxiliary control device.

2. The task execution method according to claim 1, wherein said obtaining the plurality of to-be-processed tasks, comprises: obtaining the plurality of to-be-processed tasks by polling the task queue;

said obtaining the first task in the plurality of to-be-processed tasks, comprises: obtaining the first task from the task queue; and said obtaining the second task for the target task execution device that is the one task execution device from the plurality of to-be-processed tasks, comprises: obtaining the second task for the target task execution device that is the one task execution device from the task queue.

3. The task execution method according to claim 1, wherein said controlling the task execution device associated with the current control device to execute the first task, comprises:

establishing connection with the task execution device associated with the current control device based on a secure shell (SSH) command, and controlling a task execution device successfully connected with the current control device to execute the first task.

4. The task execution method according to claim 1, wherein:

the task request is periodically sent by any one task execution device, and the task request carries identification information of the any one task execution device; and said obtaining the second task for the target task execution device that is the one task execution device from the plurality of to-be-processed tasks, comprises:

matching the identification information of the any one task execution device with identification information of the target task execution device in the plurality of to-be-processed tasks; and obtaining the second task corresponding to the matched identification information.

5. The task execution method according to claim 1, further comprising:

receiving a task completion condition of the one task execution device; and updating statuses of the plurality of to-be-processed tasks based on the task completion condition.

6. The task execution method according to claim 5, further comprising:

sending warning information in response to that it is determined that the statuses of tasks of a target quantity are failure statuses in a first target duration according to the task completion condition.

7. The task execution method according to claim 1, further comprising:

in response to that a duration from a system time to a generation time of any one to-be-processed task is a second target duration and the to-be-processed task is not distributed or not obtained yet, setting a status of the one to-be-processed task as a delivery timeout status.

8. The task execution method according to claim 1, wherein the plurality of to-be-processed tasks are provided with various formats.

9. A task execution method, applied to a task execution device, and comprising:

executing a first task based on a control instruction of a control device associated with the task execution device, wherein an execution mode of the first task is a mode that the control device controls the task execution device to execute a task;

sending a task request to the control device, wherein the task request is configured to request a second task needing to be executed by a current task execution device, and an execution mode of the second task is a mode that the task execution device execute a task by itself;

receiving the second task for a target task execution device that is the current task execution device; and executing the second task based on a content of the second task;

wherein:

the control device is in a control device cluster, and the control device cluster comprises a primary control device and at least one auxiliary control device;

the primary control device obtains all first tasks from a plurality of to-be-processed tasks according to an execution mode field, distributes all the first tasks to a plurality of control devices in the control device cluster to obtain a task distribution result corresponding to each control device, sends task distribution results corresponding to the auxiliary control devices to the auxiliary control devices in the control device cluster, and obtains the first task indicated by a task distribution result corresponding to the primary control device from the plurality of to-be-processed tasks based on the task distribution result corresponding to the primary control device;

the plurality of to-be-processed tasks is obtained by acquiring, by a plurality of scheduling devices, a plurality of task sets stored at a destination address in a preemptive mode and adding the plurality of to-be-processed tasks in the plurality of task sets to a task queue, wherein a data structure of the plurality of to-be-processed tasks comprises the execution mode field, and the execution mode field is used to determine whether each of the plurality of to-be-processed task is the first task;

in response to the control device being the auxiliary control device, receiving a task distribution result sent by the primary control device; and said obtaining the first task in the plurality of to-be-processed tasks, comprises:

obtaining the first task indicated by a task distribution result corresponding to the auxiliary control device from the plurality of to-be-processed tasks based on the task distribution result corresponding to the auxiliary control device.

10. The task execution method according to claim 9, further comprising:

in response to that a duration from a system time to a generation time of any one to-be-processed task is a third target duration and the one to-be-processed task is not executed or not completely executed yet, setting a status of the one to-be-processed task as an execution timeout status.

11. The task execution method according to claim 9, said executing the first task or the second task, comprises:
executing the first task or the second task according to a format of the first task or of the second task and according to an execution mode corresponding to the format.

12. The task execution method according to claim 9, wherein said sending the task request to the control device, comprises:
periodically sending the task request to the control device, wherein the task request carries identification information of the current task execution device.

13. The task execution method according to claim 9, further comprising:
sending a task completion condition to the control device, wherein a status of each task in the task completion condition is a successful status or a failure status, and the task completion condition comprises a failure reason of the task with the status being the failure status.

14. A control device, comprising:
one or more processors; and
one or more memories, configured to store instructions executed by the one or more processors, wherein
the one or more processors are configured to execute the instructions to implement the task execution method according to claim 1.

15. The control device according to claim 14, wherein the one or more processors are configured to execute the instructions to:
obtain the plurality of to-be-processed tasks by polling the task queue;
obtain the first task from the task queue; and
obtain the second task for the target task execution device that is the one task execution device from the task queue.

16. The control device according to claim 14, wherein the one or more processors are configured to execute the instructions to:
establish connection with the task execution device associated with the current control device based on a secure shell (SSH) command, and control a task execution device successfully connected with the current control device to execute the first task.

17. The task execution method according to claim 14, wherein:
the task request is periodically sent by any one task execution device, and the task request carries identification information of the any one task execution device; and
and the one or more processors are configured to execute the instructions to:
match the identification information of the any one task execution device with identification information of the target task execution device in the plurality of to-be-processed tasks; and
obtain the second task corresponding to the matched identification information.

18. A task execution device, comprising:
one or more processors; and
one or more memories, configured to store instructions executed by the one or more processors, wherein
the one or more processors are configured to execute the instructions to implement the task execution method according to claim 9.

* * * * *